United States Patent
Inoue

(10) Patent No.: US 11,831,839 B1
(45) Date of Patent: Nov. 28, 2023

(54) IMAGE PROCESSING APPARATUS, METHOD, AND PROGRAM PRODUCT FOR PRINTING BASED ON PDL DATA IN PRINT JOB FOR PRINTING MONOCHROME REPRESENTATION OF COLOR DATA

(71) Applicant: CANON KABUSHIKI KAISHA, Tokyo (JP)

(72) Inventor: Takuya Inoue, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/309,019

(22) Filed: Apr. 28, 2023

(30) Foreign Application Priority Data

May 9, 2022 (JP) .................................. 2022-077194

(51) Int. Cl.
*H04N 1/40* (2006.01)
*G06K 15/02* (2006.01)
*H04N 1/60* (2006.01)

(52) U.S. Cl.
CPC ..... *H04N 1/40012* (2013.01); *G06K 15/1811* (2013.01); *G06K 15/1822* (2013.01); *G06K 15/1849* (2013.01); *H04N 1/6008* (2013.01)

(58) Field of Classification Search
None
See application file for complete search history.

(56) References Cited

U.S. PATENT DOCUMENTS

| | | | |
|---|---|---|---|
| 8,310,728 B2 * | 11/2012 | Koyatsu | G03G 15/556 382/175 |
| 10,929,727 B2 | 2/2021 | Inoue | |
| 11,095,794 B2 * | 8/2021 | Nagasaka | H04N 1/40012 |
| 11,356,578 B2 * | 6/2022 | Eguchi | G06K 15/188 |
| 11,438,483 B2 * | 9/2022 | Inoue | H04N 1/4092 |
| 11,671,548 B2 * | 6/2023 | Inoue | H04N 1/40012 358/2.1 |
| 2007/0070466 A1 * | 3/2007 | Okuyama | H04N 1/46 358/518 |

(Continued)

FOREIGN PATENT DOCUMENTS

| JP | 2008221673 A | * | 9/2008 |
|---|---|---|---|
| JP | 2011249931 A | * | 12/2011 |
| JP | 2020049939 A | | 4/2020 |

(Continued)

*Primary Examiner* — Scott A Rogers
(74) *Attorney, Agent, or Firm* — ROSSI, KIMMS & McDOWELL LLP

(57) ABSTRACT

The technique of the present disclosure can achieve processing efficiency and prevention of improper drawing in printing a monochrome representation of color data. In performing discriminability reproducing color conversion processing, a PDL analysis unit determines whether processing involving color change that changes the original color is specified in operator information on a target object for the discriminability reproducing color conversion processing. In a case where processing that changes the original color, such as ROP or α-blending, is specified for the target object, the discriminability reproducing color conversion processing for the page is canceled and switched to all-color uniform color conversion processing. This enables both of efficient discriminability reproducing color conversion and prevention of improper drawing.

12 Claims, 16 Drawing Sheets

(56) References Cited

U.S. PATENT DOCUMENTS

2011/0205564 A1\* 8/2011 Satoh ................ G06K 15/1822
358/1.9

FOREIGN PATENT DOCUMENTS

| JP | 2021062553 A | \* | 4/2021 |
| JP | 2021109341 A | \* | 8/2021 |
| JP | 2022029279 A | \* | 2/2022 |

\* cited by examiner

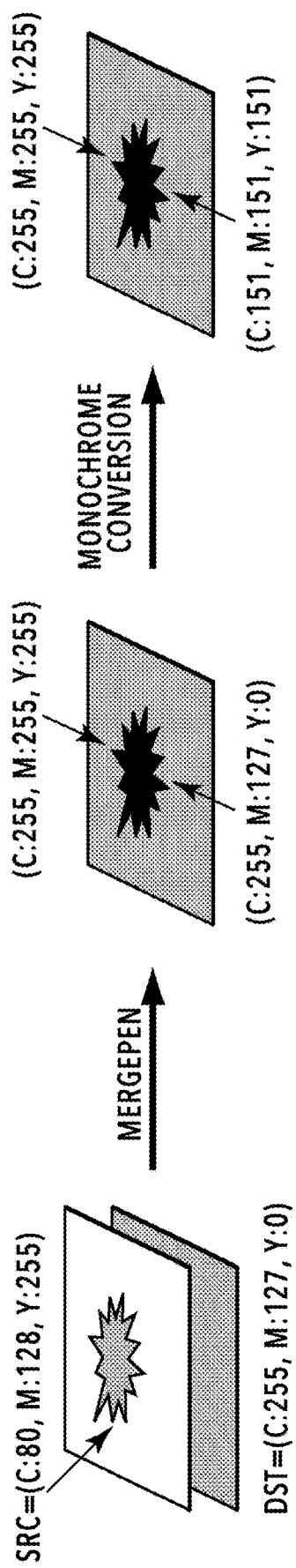
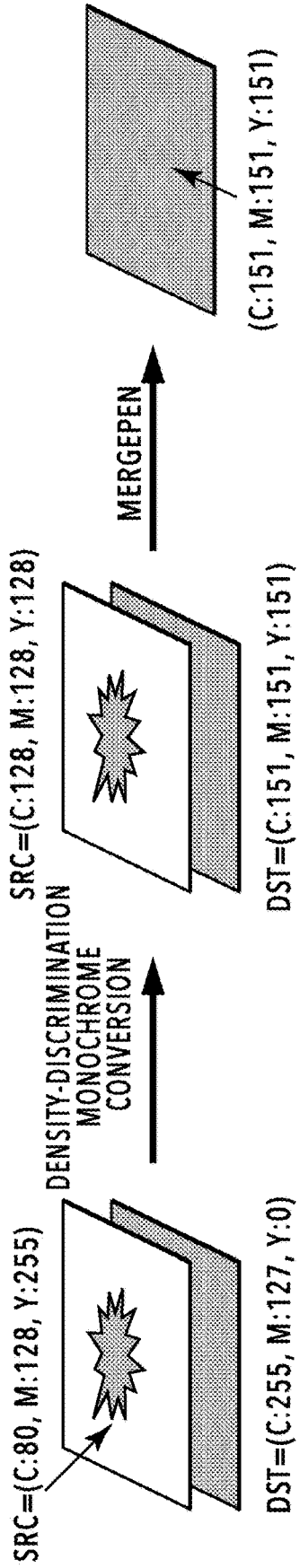
FIG.1A
FIG.1B

| FILL INDEX | FILL INFORMATION |
|---|---|
| 1 | R:255, G:0, B:0 |
| 2 | R:0, G:255, B:0 |
| 3 | R:0, G:0, B:255 |
| ... | ... |
| 12 | R:0, G:255, B:0 |
| ... | ... |
| 22 | R:255, G:0, B:0 |
| ... | ... |
| 25 | R:0, G:255, B:0 |
| ... | ... |
| 28 | R:255, G:0, B:0 |
| 29 | R:255, G:255, B:255 |
| 30 | R:0, G:255, B:0 |
| ... | ... |
| 1007 | R:255, G:0, B:0 |
| ... | ... |
| 1212 | R:255, G:0, B:0 |

FIG.7A  FIG.7B

IMAGE PROCESSING APPARATUS, METHOD, AND PROGRAM PRODUCT FOR PRINTING BASED ON PDL DATA IN PRINT JOB FOR PRINTING MONOCHROME REPRESENTATION OF COLOR DATA

BACKGROUND OF THE INVENTION

Field of the Invention

The present invention relates to an image processing technique for printing a monochrome representation of color data.

Description of the Related Art

In a printing apparatus, as a method for outputting a monochrome representation of color data represented in RGB format or the like, there is a method of converting inputted RGB values into color values of a single color using the same conversion formula (such as NTSC conversion) uniformly for all the color values (hereinafter referred to as all-color uniform color conversion) and outputting the post-conversion color values. All-color uniform color conversion is effective for an original that requires gradation. However, all-color uniform color conversion may lose discriminablity because different RGB values may be converted to the same color value (or close color values) at the conversion into color values of a single color.

In order to reproduce discriminablity in an image obtained by conversion into single-color color values and outputted, Japanese Patent Laid-Open No. 2020-49939 proposes a color conversion method that gives density differences depending on the number of colors used on each page of an original (hereinafter referred to as di scriminablity reproducing color conversion).

In the method disclosed by Japanese Patent Laid-Open No. 2020-49939, however, when color data has specification of color synthesis or transparency such as a raster operation (ROP) or α-blending, improper drawing may occur in which, e.g., regions that should have different color values have the same color value. The processing efficiency of the discriminability reproducing color conversion disclosed by Japanese Patent Laid-Open No. 2020-49939 is higher in a case of being performed on intermediate data before rasterizing than in a case of being performed on raster data after rasterizing. Thus, it is desirable to perform the discriminability reproducing color conversion before the conversion into raster data using color conversion such as ROP or α-blending, but performing the processing in this order may result in improper drawing.

SUMMARY OF THE INVENTION

Thus, the present invention has an object to achieve both efficient discriminability reproducing color conversion and prevention of improper drawing in printing a monochrome representation of color data.

An image processing apparatus according to the present invention is an image processing apparatus that generates raster image data for printing based on PDL data included in a print job for printing a monochrome representation of color data, the image processing apparatus including: analysis unit configured to analyze a draw command included in the PDL data and generates intermediate data; and color conversion unit configured to convert a color value of color specified for an object generated based on the draw command included in the intermediate data into a color value of a single color by using a color conversion method specified in the print job, in which in a case where a first color conversion method that reproduces discriminability is specified in the print job as the color conversion method, if the PDL data includes a draw command that changes the color specified for the object, the color conversion unit changes the color conversion method to a second color conversion method that does not reproduce discriminability, at least for the object generated based on the draw command that changes the color.

Further features of the present invention will become apparent from the following description of exemplary embodiments with reference to the attached drawings.

BRIEF DESCRIPTION OF THE DRAWINGS

FIG. 1A is a diagram showing an example of monochrome processing by all-color uniform color conversion involving ROP processing;

FIG. 1B is a diagram showing an example of monochrome processing by discriminability reproducing color conversion involving ROP processing;

DESCRIPTION OF THE EMBODIMENTS

Figure 2:
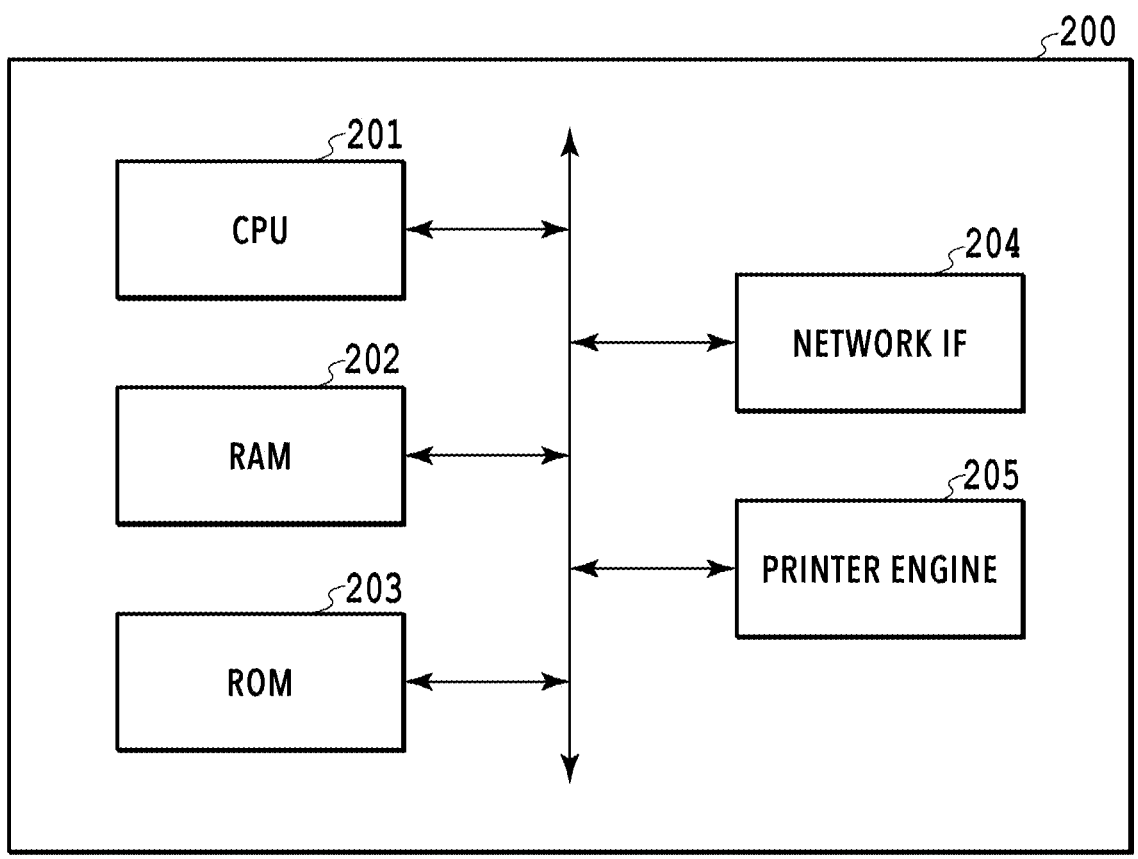
FIG. 2 is a block diagram showing an example hardware configuration of a printing control apparatus according to a first embodiment.

Modes for carrying out the present invention are described below using the drawings. Note that constituent elements described in the following embodiments are used to show a mode as an example of the present invention, and are not intended to limit the scope of the present invention only to them.

First Embodiment

First, using FIGS. 1A and 1B, an example is described where improper drawing is resulted from performing discriminability reproducing color conversion processing in a case where a page contains specification of ROP which changes the original color (specified color). ROP is processing for performing a logical operation specified by an ROP code on DST (destination) pixels of a background object using SRC (source) of a foreground object and thereby determining values common to the pixels of the background object and the foreground object. There are a plurality of kinds of ROP codes, and a predefined operational expression is allocated to each code.

FIG. 1A illustrates an example of all-color uniform color conversion, which is a color conversion method typically used for conversion to monochrome. The color of DST which is background object is (cyan (C): 255, magenta (M): 127, yellow (Y): 0), and the color of SRC which is a foreground object is (C: 80, M: 128, Y: 255) in the marking at the center and is white around the marking. Applying MERGEPEN, which is ROP processing for performing a logical operation OR, to the SRC and the DST yields black (C: 255, M: 255, Y: 255) in the center marking portion and (C: 255, M: 127, Y: 0) in the portion therearound. The logical operation OR is processing to compare corresponding digits in two binary values and sets "1" for the digits in a case where either one of them is "1." Lastly, monochrome conversion processing is performed on the ROP-processed image, thereby generating a monochrome image which is black (C: 255, M: 255, Y: 255) in the marking portion and (C: 151, M: 151, Y: 151) in the portion therearound.

Meanwhile, FIG. 1B illustrates an example where improper drawing is resulted from performing discriminability reproducing color conversion processing, which is a color conversion method used in monochrome conversion for reproducing discriminability by setting the intervals between color values depending on the number of colors in a page. Like in FIG. 1A, DST has color (cyan (C): 255, magenta (M): 127, yellow (Y): 0), and SRC has a marking of color (C: 80, M: 128, Y: 255) in the center and is white therearound. In the discriminability reproducing color conversion, first, the DST and the SRC are converted into a single color, e.g., gray, that reproduces discriminability by giving density differences. Then, ROP processing is performed using MERGEPEN. A binary representation of the density value of SRC "128" is "10000000," and a binary representation of the density value of DST "151" is "10010111." Thus, as a result of applying MERGEPEN as ROP processing to them, the density value for the marking portion becomes "10010111" and is therefore the same density value as the DST. Thus, in this example, improper drawing occurs where the center marking portion and the DST which are supposed to have different density values have the same density value, which makes the marking portion indiscriminable.

In the first embodiment, in performing discriminability reproducing color conversion processing, discriminability reproducing color conversion processing is canceled and switched to all-color uniform color conversion processing in a case where a page contains an object for which ROP or α-blending that changes the original color (specified color) is specified. This prevents improper drawing as shown in FIG. 1B. Note that the sequences performed in the present invention are ones that are performed in a case where a user selects discriminability reproducing color conversion in a configuration where the user can select discriminability reproducing color conversion as a color conversion method in making a setting for a print job as the printer driver's print settings.

FIG. 2 is a block diagram showing an example hardware configuration of a printing control apparatus 200 according to a first embodiment. A CPU 201 is a processing unit that performs overall control of the printing control apparatus 200. A RAM 202 is a storage device that the CPU 201 can access, and is used as work memory for the CPU 201 to operate in the present embodiment. A ROM 203 has programs stored therein, and the CPU 201 loads the programs into the RAM 202 and executes them, thereby causing the software modules shown in FIG. 3 to be described later to operate. A network IF 204 is an interface for connecting to an external device (such as a personal computer or other information processing apparatus) via a network to mainly receive print data. Note that in the present embodiment, data in page description language (PDL) is received as the print data from an external device. A printer engine 205 performs printing on a printing medium (such as a sheet of paper) according to the PDL data interpreted by the CPU 201.

Figure 3:
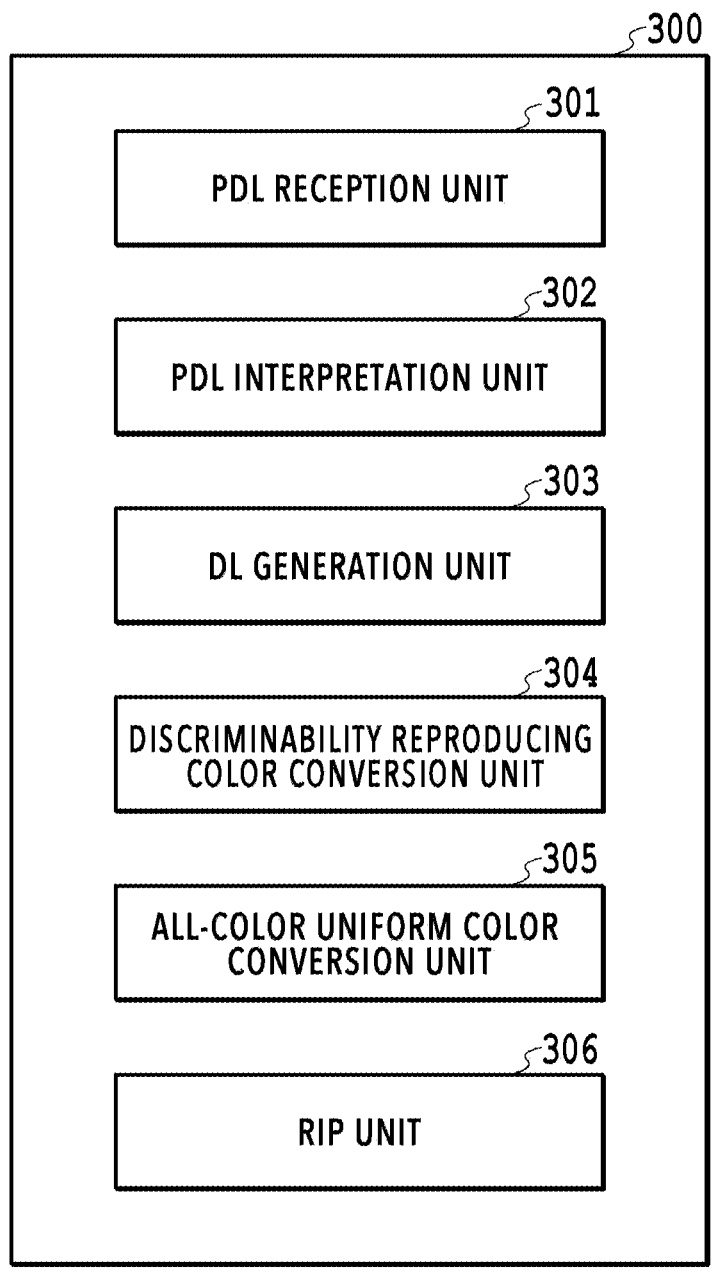
FIG. 3 is a diagram showing an example software configuration of the printing control apparatus.

FIG. 3 is a diagram showing an example software configuration of the printing control apparatus 200. As shown in FIG. 3, the printing control apparatus 200 has software modules 301 to 306 implemented by the CPU 201 executing programs loaded from the ROM 203 into the RAM 202. The printing control apparatus 200 also functions as an image processing apparatus by causing these software modules to operate.

A PDL reception unit 301 receives, via the network IF 204, PDL data outputted from a printer driver on an external device. The PDL data received is then stored in the RAM 202. Note that although the present embodiments describes an example of receiving PDL data from an external device via a network, the PDL data may be stored in the RAM 202 in advance.

A PDL interpretation unit 302 reads and interprets a draw command specified in the PDL data stored in the RAM 202. Based on this draw command, the shape and color information on an object to be drawn are determined, and an object is generated.

Figure 4:
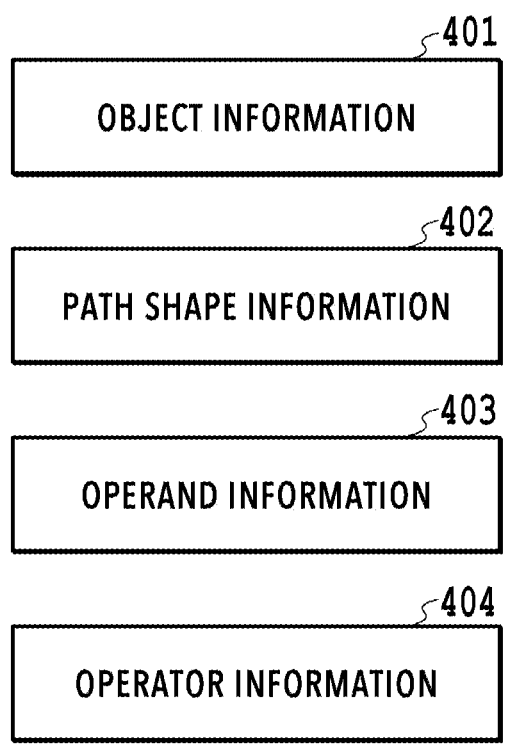
FIG. 4 is a diagram showing an example configuration of an object.

Now, the configuration of an object is described. FIG. 4 is a diagram showing an example configuration of an object. Object information 401 is information indicative of the attribute of the object, such as whether the object is an image object or a graphic object. Path shape information 402 is information related to the position and outline of the object, such as object's draw range information and path dot sequence information representing the outline of the object with a sequence of dots. Operand information 403 is drawing-related information such as the operand type of the object (such as Image or FlatFill) and color information such as color space (e.g., RGB or Gray) and color values. Operator information 404 is information related to the layer of the object. Specifically, the operator information 404 is information related to synthesis processing, transparency processing, or the like such as raster operation (ROP) and alpha-blending (α-blending).

Back to the description using FIG. 3, a DL generation unit 303 generates a display list (DL), which is intermediate data, from the object. The DL generation unit 303 also analyzes the color information associated with the object and holds the analyzed color information.

In a case where each object's color information held by the DL generation unit 303 satisfies a predetermined condition, a discriminability reproducing color conversion unit 304 executes discriminability reproducing color conversion which converts color values of a plurality of colors into color values of a corresponding single color with the intervals between the color values of the single color being set depending on the number of colors in a page. Although converting a full-color image into a monochrome image may lower the object's discriminability, the discriminability reproducing color conversion performs color conversion so that the high discriminability in the full-color image may be reproduced in a monochrome image as much as possible.

In a case where each object's color information held by the DL generation unit 303 does not satisfy the predetermined condition, a full-color uniform color conversion unit 305 executes full-color uniform color conversion, i.e., color conversion using a color conversion method (such as NTSC conversion) that converts all color values into color values of a single color in conformity to a uniform conversion rule.

A RIP unit 306 renders (rasterizes) the DL generated by the DL generation unit 303. The structure of the DL will be described later using FIGS. 7A and 7B.

Next, the operation of the printing control apparatus 200 is described. A rough process of the processing performed by the printing control apparatus 200 is described first. The printing control apparatus 200 receives PDL data outputted from a printer driver, interprets the PDL data, and generates a DL. After that, the printing control apparatus 200 converts the DL into bitmap image data (raster image data) for printing, and performs printing based on the bitmap image data. The following describes details of the operation performed by the printing control apparatus 200 up to the DL generation using FIG. 5, and describes details of the operation performed by the printing control apparatus 200 up to the conversion of DL to bitmap image data and printing of the bitmap image data using FIG. 10.

Figure 5:
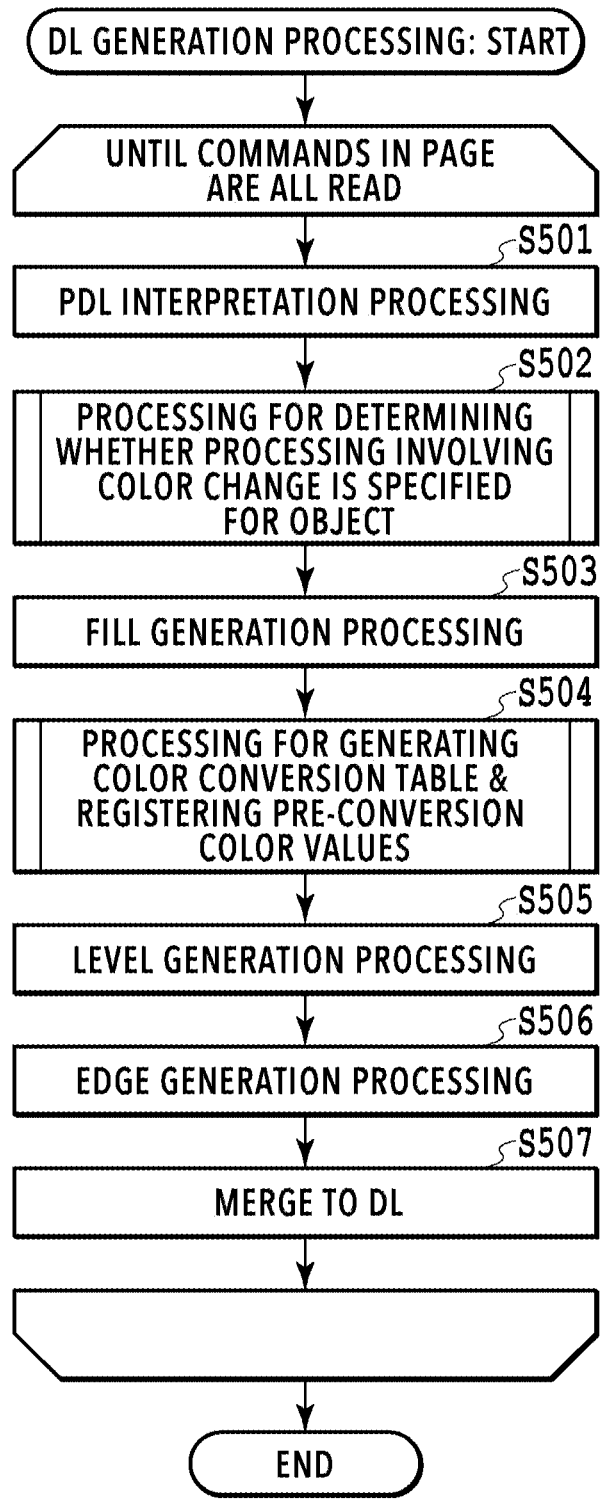
FIG. 5 is a flowchart showing DL generation processing in the first embodiment.

FIG. 5 is a flowchart showing DL generation processing performed on PDL data stored in the RAM 202 on a page by page basis in the first embodiment. The series of steps of processing represented as the flowchart shown in FIG. 5 is implemented by the CPU 201 loading programs stored in the ROM 203 into the RAM 202 and executing them.

In S501, the PDL interpretation unit 302 reads draw comments from each page in PDL data stored in the RAM 202, interprets the draw commands thus read, and generates an object.

In S502, the PDL interpretation unit 302 determines whether processing involving color change is specified for any object in the same page. Details will be described later using FIG. 6.

Next, in S503 to S507, the DL generation unit 303 sequentially executes fill generation processing, level generation processing, and edge generation processing on the object in the same page generated in S501 and lastly performs merge processing to generate a DL.

Note that an edge refers to the border between an object and an object drawn in a page or the border between an object and the background. The shape of an object is formed by the left and right (scan line's upstream and downstream) edges. A level is information (a number) indicating the upper and lower relation between objects to be drawn in a page, and each object always has a level (a number) assigned thereto. The level is also called a Z-order and indicates the order in which objects are arranged in a direction from back to front of a page (along the Z-axis direction: a direction orthogonal to an XY-plane in a case where the draw range on a page is represented on the XY-plane). Note that because the shape of an object is formed by the left and right edges as described above, the upper and lower relation between edges to be drawn in a page is also indicated by levels. Fill is filling information with respect to a span, and there are fill having a different color value for each pixel, such as a bitmap image or shading, and fill having no change of color value within a span, such as solid filling.

In S503, the DL generation unit 303 generates fill information from the operand information on the object. The fill information includes information related to the color colored for the object and a pattern.

In S504, based on the fill information, the DL generation unit 303 performs processing for generating a color conversion table for reproducing discriminability and registering pre-conversion color values. Details will be described later using FIG. 8.

Figure 7:
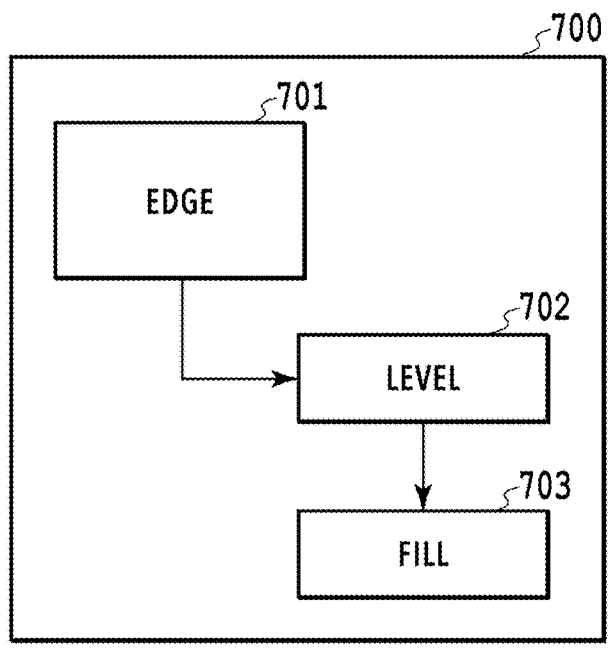
FIG. 7A is a diagram showing an example configuration of a DL in the first embodiment.
FIG. 7B is a diagram showing a fill table in the first embodiment.

In S505, the DL generation unit 303 generates level information from the operator information. The level information is information indicating the upper and lower relation between objects placed in a page. For instance, an object of level 1 means that the object is drawn on top of an object of level 0. With regard to the level information, the levels of objects are determined in principle according to the order in which the objects are processed, with information related to ROP and the like contained in the operator information taken into consideration. As shown in FIG. 7A, fill information 703 generated in S503 is linked from level information 702.

In S506, the DL generation unit 303 generates edge information from the path shape information. As shown in FIG. 7A, the level information 702 generated in S505 is linked from edge information 701. The edge information, the level information, and the fill information can thus be obtained. In other words, FIG. 7A shows that one edge list 700 in a DL is a result of the edge information 701, the level information 702, and the fill information 703 linked as described above.

In S507, the DL generation unit 303 performs merge processing to merge the edge information on the object generated in S506 into the DL.

A DL for one page is generated by performing S501 to S507 on all the objects in the same page. Fill information in a DL is, as shown in FIG. 7B, registered in a fill table 710, while being associated with a fill index assigned to each object.

Figure 6:
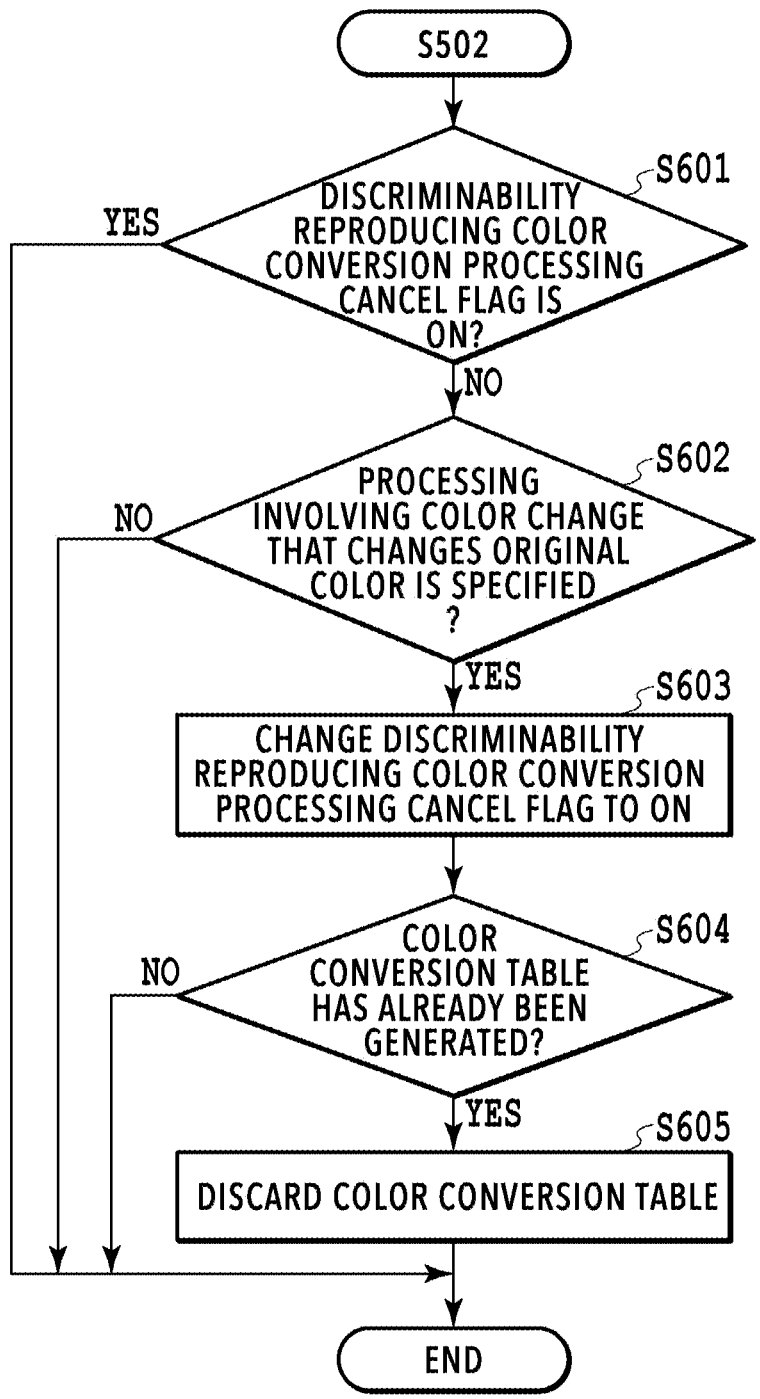
FIG. 6 is a flowchart showing ROP determination processing in the first embodiment.

Now, using FIG. 6, a description is given of the determination processing (S502) for determining whether there is any object for which processing involving color change is specified, the determination processing being performed for each page by the PDL interpretation unit 302.

In S601, the PDL interpretation unit 302 determines whether a discriminability reproducing color conversion processing cancel flag provided in the PDL interpretation unit 302 is ON. If the flag is ON (YES in S601), this processing ends. If the flag is OFF (NO in S601), the processing proceeds to S602. Note that the discriminability reproducing color conversion processing cancel flag is set to OFF at the top of a page, i.e., is set to OFF in performing the present processing on an object within a page. Using this discriminability reproducing color conversion processing cancel flag, control is performed on a page by page basis whether to execute or cancel the discriminability reproducing color conversion processing.

In S602, the PDL interpretation unit 302 determines whether processing involving color change that changes the original color is specified in the operator information 404 on an object targeted for the discriminability reproducing color conversion processing. The specification of processing involving color change is, for example, specification of ROP or α-blending, such as a logical OR operation (MERGEPEN), a logical AND operation (MASKPEN), and a logical XOR operation (XORPEN). If there is no specification of processing involving color change (NO in S602), the present processing ends. If processing that changes the original color, such as ROP or α-blending, is specified for the target object (YES in S602), the processing proceeds to S603.

In S603, the PDL interpretation unit 302 sets the discriminability reproducing color conversion processing cancel flag to ON.

In S604, the PDL interpretation unit 302 determines whether a color conversion table has already been generated. If a color conversion table has already been generated (YES), the processing proceeds to S605, and if a color conversion table has not been generated (NO), the present processing ends.

In S605, the PDL interpretation unit 302 discards the color conversion table.

Figure 8:
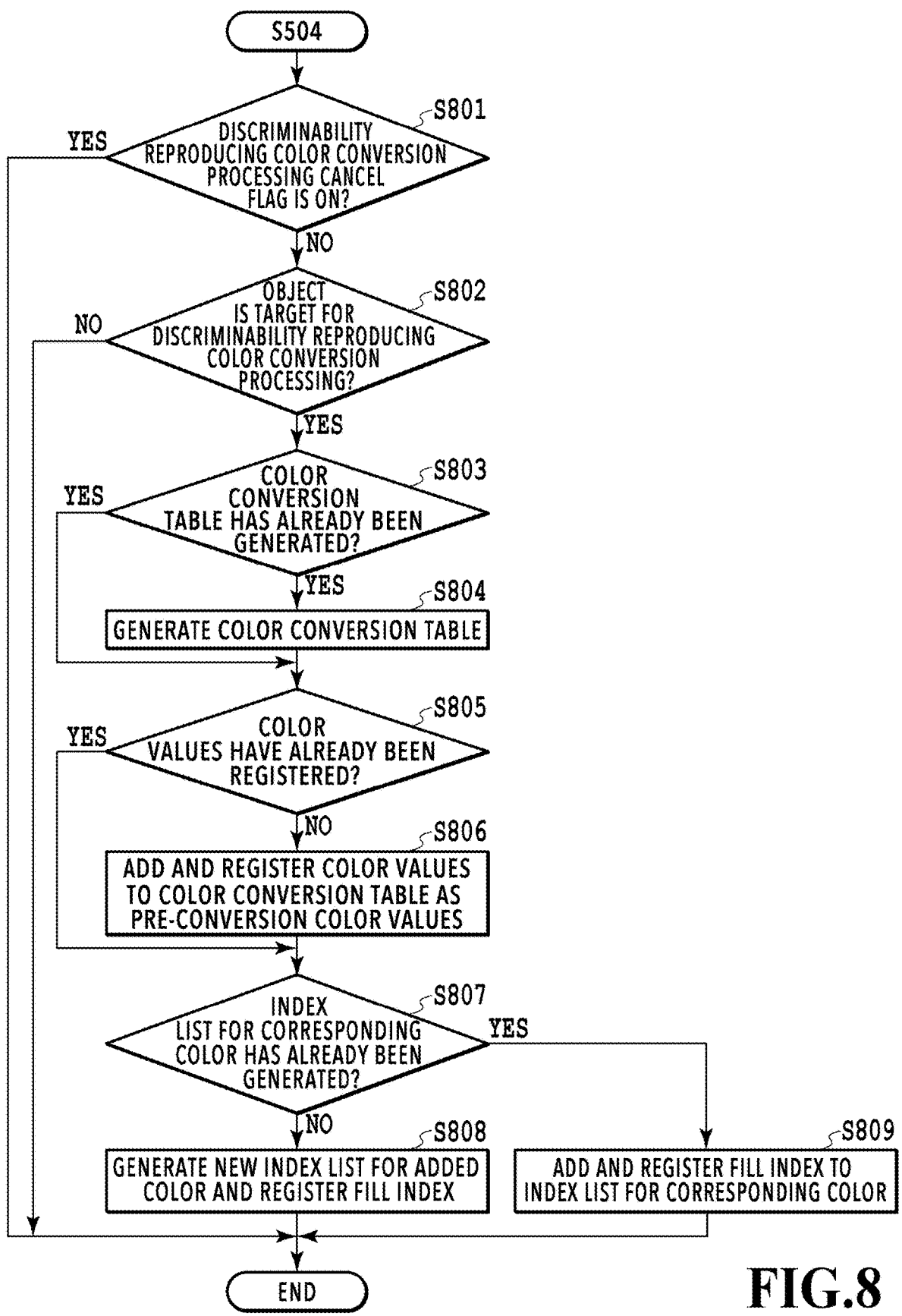
FIG. 8 is a flowchart showing color conversion table generation processing and pre-conversion color value registration processing in the first embodiment.
Figure 9:
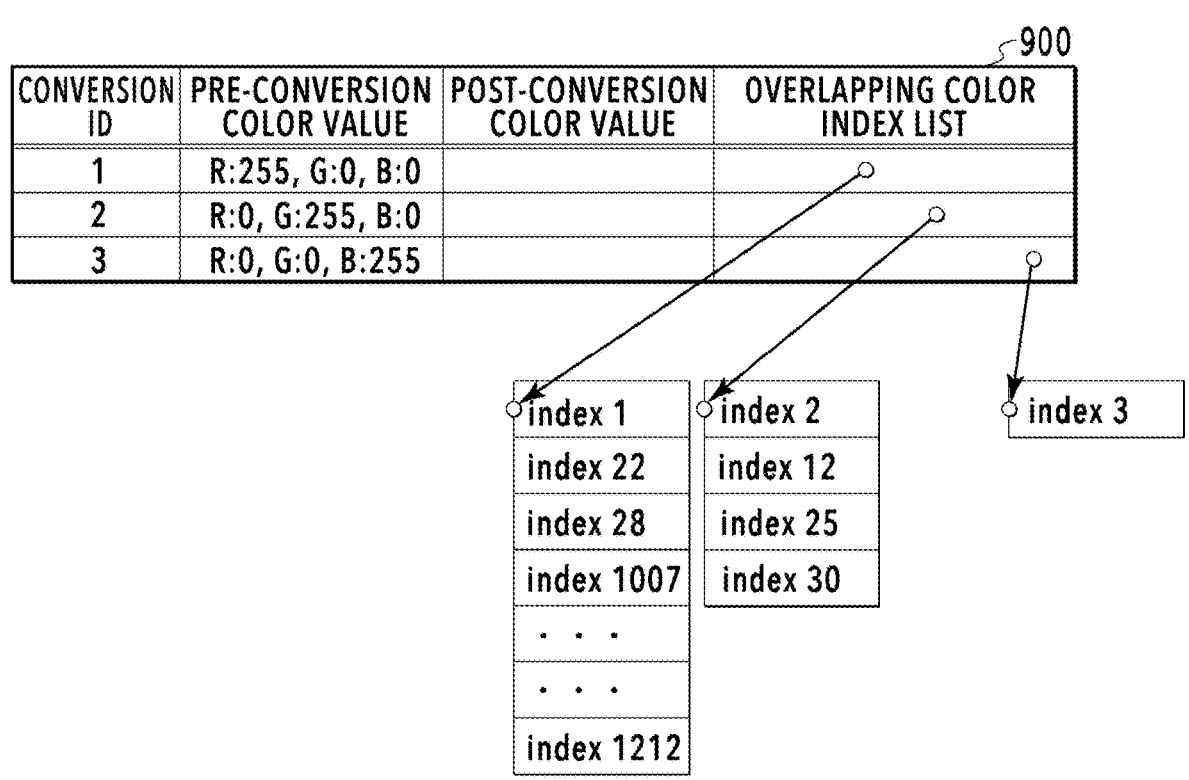
FIG. 9 is a diagram illustrating a color conversion table in which pre-conversion color values are registered in the first embodiment.

Next, using FIG. 8, a description is given of processing (S504) for generating a color conversion table for discriminability reproduction and registering pre-conversion color values, which is performed by the DL generation unit 303. Also, the description is given taking a color conversion table 900 shown in FIG. 9 as an example.

In S801, the DL generation unit 303 determines whether the discriminability reproducing color conversion processing cancel flag is ON. If the flag is ON (YES in S801), the present processing ends. If the flag is OFF (NO in S801), the processing proceeds to S802.

In S802, if the target object of the present processing is a target for the discriminability reproducing color conversion processing (YES in S802), the DL generation unit 303 proceeds to S803. If the target object to be processed is not a target for the discriminability reproduction (NO in S802), the present processing ends.

In S803, if the color conversion table 900 has already been generated (YES in S803), the DL generation unit 303 proceeds to S805. If the color conversion table 900 has not been generated (NO in S803), the processing proceeds to S804.

In S804, the DL generation unit 303 generates an empty color conversion table 900 and proceeds to S805.

In S805, the DL generation unit 303 acquires color values for the target object and determines whether they have already been registered in the color conversion table 900. If they have already been registered (YES in S805), the processing proceeds to S807, and if they have not been registered (NO in S805), the processing to S806.

In S806, the DL generation unit 303 adds and registers the target object's color values obtained in S805 to the obtained color conversion table 900 as pre-conversion color values.

In S807, the DL generation unit 303 determines whether an index list for the corresponding color in the color conversion table 900 has already been generated. The index list is a list of fill indices for which the same color is registered in the fill table 710 as fill information. If an index list has not been generated (NO in S807), the DL generation unit 303 generates an index list for the corresponding color, adds the fill index of the corresponding object to the generated index list, and ends the processing. If the index list has already been generated (YES in S807), the DL generation unit 303 adds the fill index of the corresponding object to the index list of the corresponding color and ends the processing.

Figure 10:
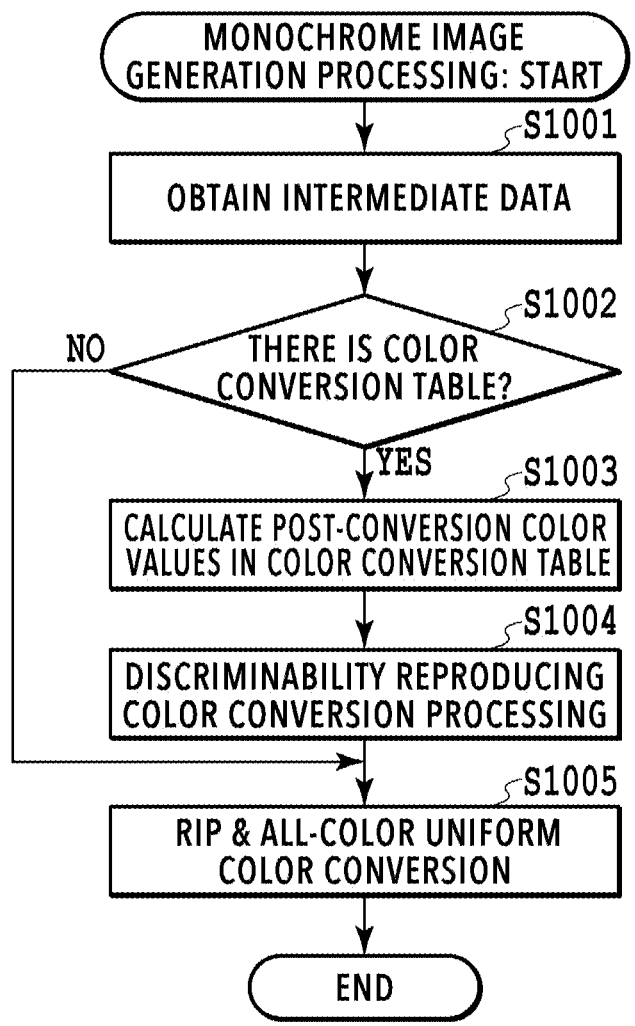
FIG. 10 is a flowchart showing monochrome image generation processing in the first embodiment.

FIG. 10 is a flowchart showing monochrome image generation processing in the first embodiment. The series of steps of processing shown in the flowchart shown in FIG. 10 is implemented by the CPU 201 loading the programs stored in the ROM 203 into the RAM 202 and executing them.

In S1001, the RIP unit 306 obtains intermediate data generated by the DL generation unit 303.

In S1002, the discriminability reproducing color conversion unit 304 determines whether there is a color conversion table. If there is no color conversion table (NO in S1002), the processing proceeds to S1005. If there is a color conversion table (YES in S1002), the processing proceeds to S1003.

Figure 11:
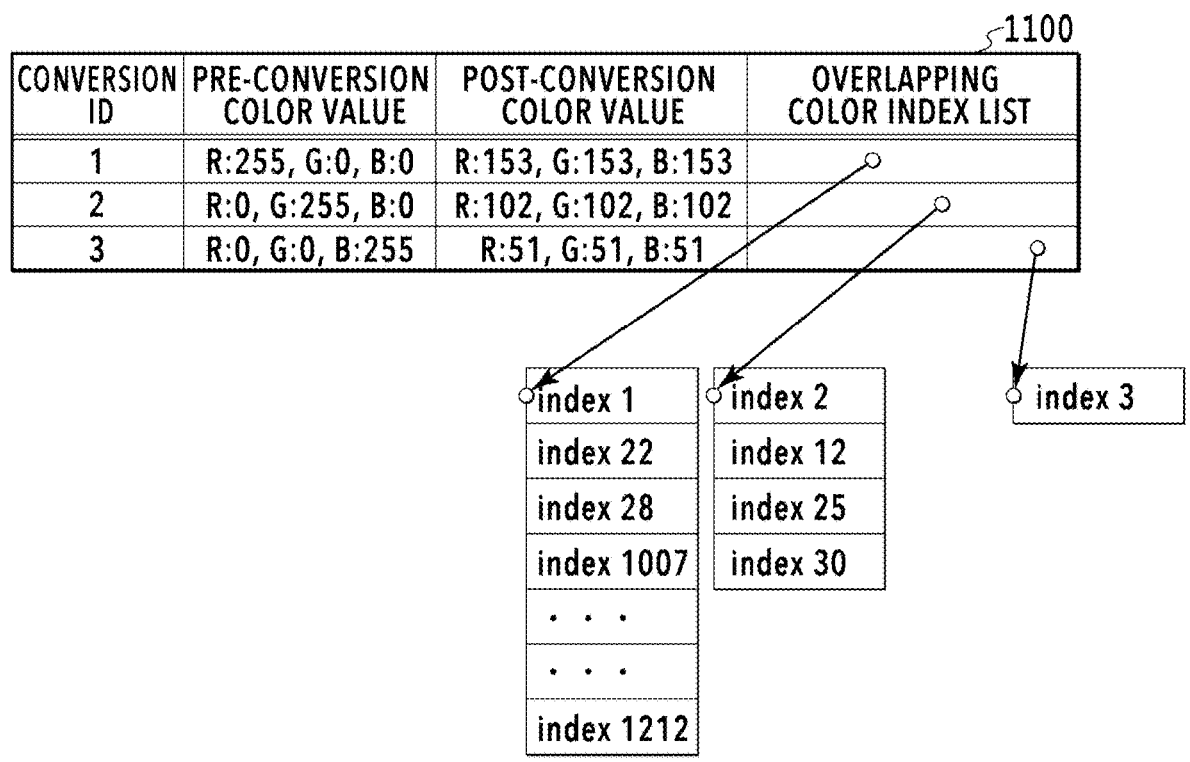
FIG. 11 is a diagram illustrating a completed color conversion table in the first embodiment.

In S1003, the discriminability reproducing color conversion unit 304 obtains the color conversion table 900, derives post-conversion color values based on the number of colors and the pre-conversion color values in the color conversion table, and registers the post-conversion color values in the color conversion table 900. Note that because the processing for deriving post-conversion color values and storing them in a color conversion table is a prior art and is therefore not described further in detail here. FIG. 11 shows an example of a color conversion table 1100 in which pre-color-conversion color values and corresponding post-conversion color values are registered. The color conversion table 1100 has registered therein a pre-conversion color value, which is an original color value, a post-conversion color value for which a density-value interval is set according to the number of colors in a page so that the discriminability may be reproduced in a monochrome image, and an index list of a target object, which are associated with one another.

Figure 12:
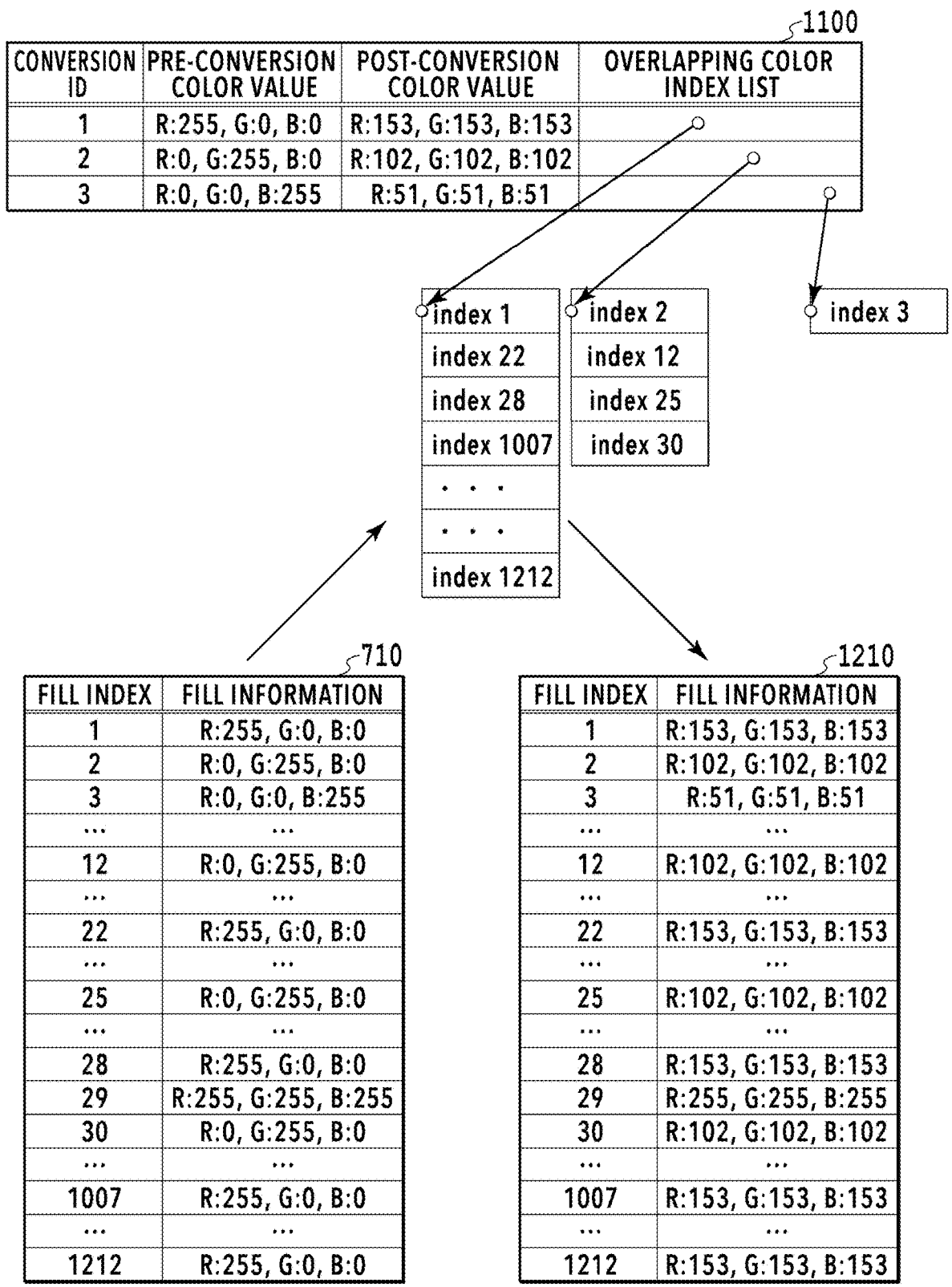
FIG. 12 is a diagram illustrating discriminability reproducing color conversion using the color conversion table in the first embodiment.

In S1004, the discriminability reproducing color conversion unit 304 performs color conversion of the intermediate data using the color conversion table obtained in S1003. An example of the color conversion in S1004 is described using FIG. 12. To perform color conversion, first, fill indices in the index list associated with each conversion ID in the color conversion table 1100 are identified on the fill table 710 for the intermediate data. Next, the color values registered as fill information in association with the fill indices identified on the fill table 710 are rewritten into the post-conversion color values in the color conversion table 1100. A fill table 1210 is a fill table for intermediate data, in which the color values of an object targeted for the discriminability reproducing color conversion processing are thus rewritten into color values for reproducing the discriminability of a full-color image.

In S1005, based on the fill table 1210 for intermediate data updated in S1004, the RIP unit 306 performs RIP on the object targeted for the discriminability reproducing color conversion processing. In this way, raster image data on a monochrome image reproducing the discriminability of the target object in a full-color image is generated. Also, as for objects not targeted for the discriminability reproducing color conversion processing, the full-color uniform color conversion unit 305 performs all-color uniform color conversion such as NTSC conversion and thereby generates raster image data on a monochrome image. By performing printing based on the monochrome image thus generated, the printer engine 205 of the printing control apparatus 200 can achieve monochrome printing in which the discriminability reproducing color conversion processing is performed on an object for which discriminability is to be achieved.

As thus described, in the present embodiment, in performing the discriminability reproducing color conversion processing, it is determined whether a page contains any object for which processing involving color change, such as ROP or α-blending, is specified. Then, if the page contains an object for which processing that changes the original color is specified, discriminability reproducing color conversion processing is cancelled for that page and switched to all-color uniform color conversion processing, so that improper drawing can be prevented.

Second Embodiment

In a second embodiment, in performing the discriminability reproducing color conversion processing, in a case where a page contains an object for which processing involving color change is specified, an object that overlaps with that object is not targeted for the discriminability reproducing color conversion processing. Then, for objects other than the object for which processing involving color change is specified and the object that overlaps with that object, the discriminability reproducing color conversion processing is performed. This prevents improper drawing and also enables discriminability reproducing color conversion. Note that the configuration of the printing control apparatus of the second embodiment is similar to that of the first embodiment shown in FIGS. 2 and 3. The following describes points different from the first embodiment.

Figure 13:
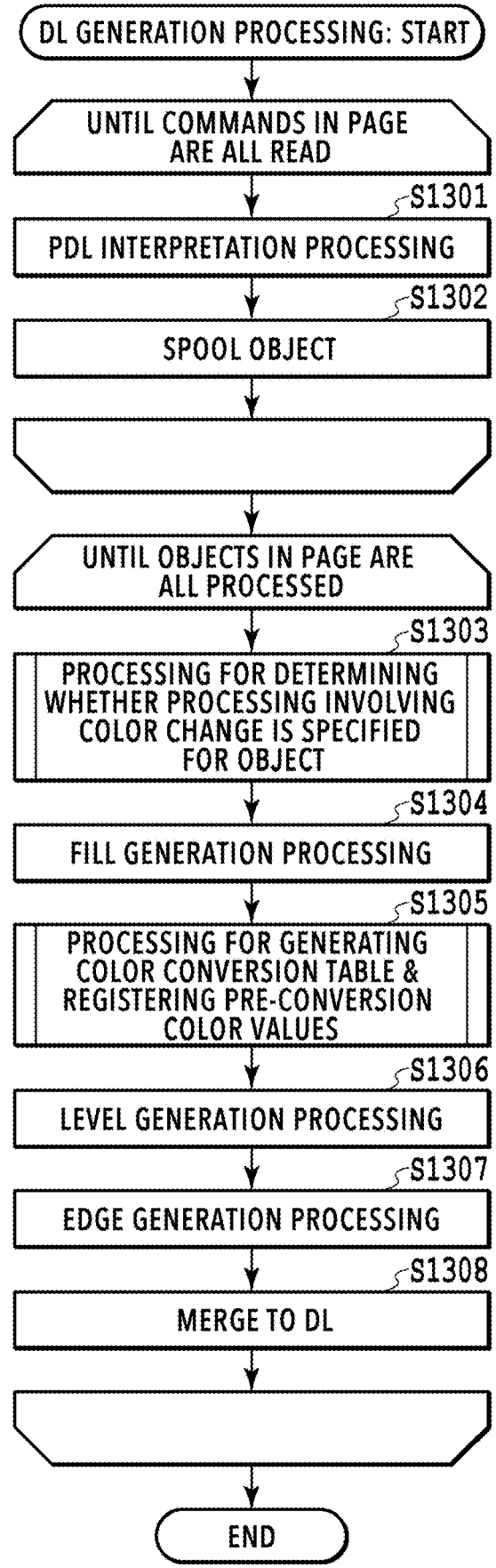
FIG. 13 is a flowchart showing DL generation processing in a second embodiment.

FIG. 13 is a flowchart showing DL generation processing in the second embodiment, performed for each page in PDL data stored in the RAM 202. The series of steps of processing shown as a flowchart in FIG. 13 is implemented by the CPU 201 loading the programs stored in the ROM 203 into the RAM 202 and executing them.

First, the PDL interpretation unit 302 repeats the processing in S1301 and S1302 until all the commands in a page are read.

In S1301, the PDL interpretation unit 302 reads a draw command for a processing-target page from the PDL data stored in the RAM 202, interprets the draw command thus read, and generates an object.

In S1302, the PDL interpretation unit 302 spools the generated object in the RAM 202. The region for the spooling may be a configuration such as a hard disk of an auxiliary storage device.

Once all the objects in the page are spooled, one of the objects is selected from the page as a target object, processing in S1303 to S1308 is performed thereon, and this is repeated until all the objects in the page are processed.

In S1303, the PDL interpretation unit 302 performs processing for determining whether processing involving color change is specified for the target object. Details will be described later using FIG. 14.

In S1304 to S1308, the DL generation unit 303 sequentially executes fill generation processing, level generation processing, and edge generation processing on the object generated and then performs merge processing to generate a DL. The processing in S1304 to S1308 is the same as that described for S503 to S507 and is therefore not described here.

Figure 14:
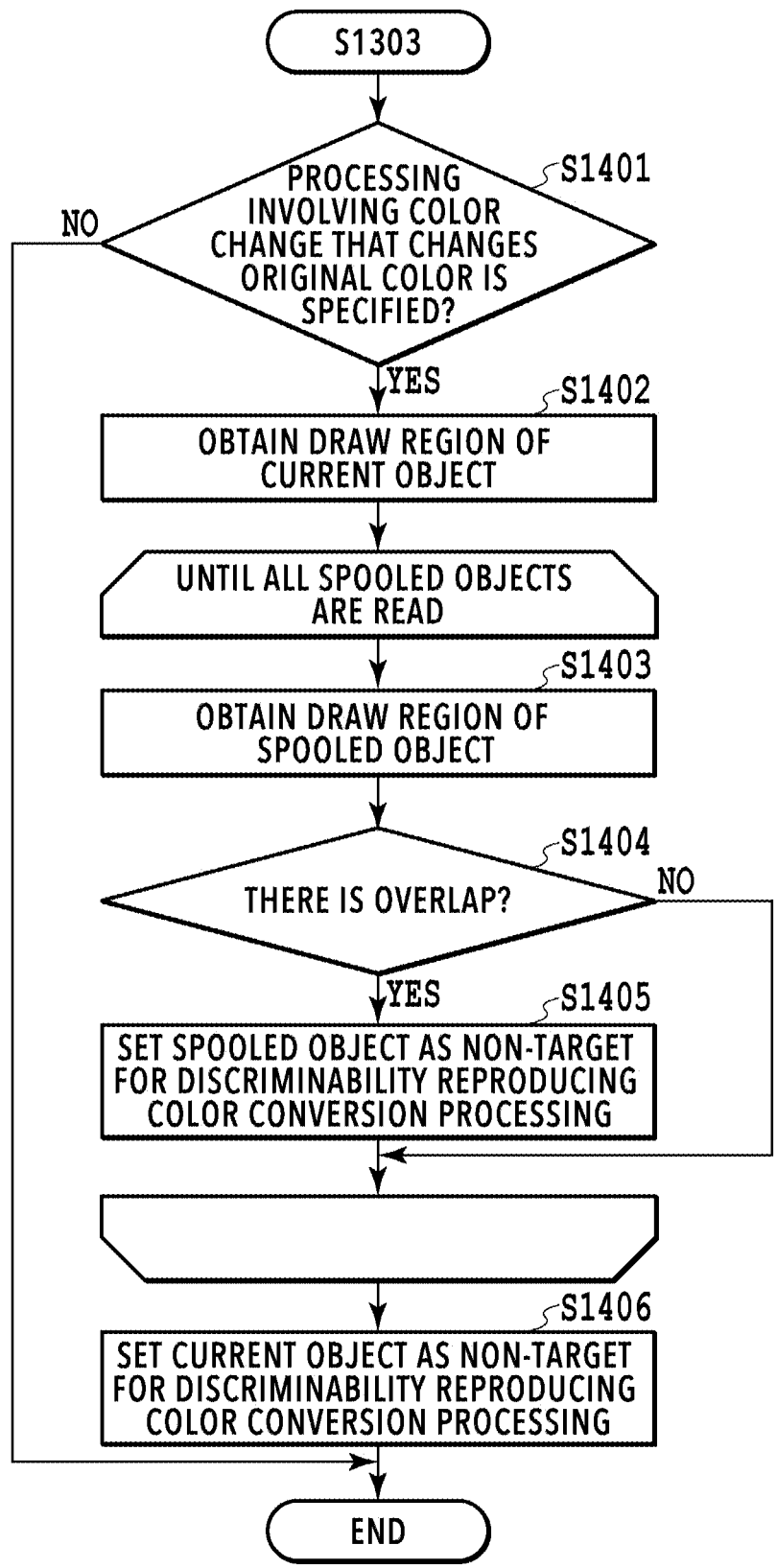
FIG. 14 is a flowchart showing ROP determination processing in the second embodiment.

Now, using FIG. 14, a description is given of processing (S1303) for determining whether processing involving color change is specified for a target object, which is performed by the PDL interpretation unit 302.

In S1401, the PDL interpretation unit 302 determines whether processing that changes the original color such as ROP is specified in the operator information 404 on the target object. The specification of processing that changes the original color is, for example, specification of ROP or α-blending, such as a logical OR operation (MERGEPEN), a logical AND operation (MASKPEN), and a logical XOR operation (XORPEN). If there is no specification of processing that changes the original color (NO in S1401), the present processing ends. If there is specification of processing that changes the original color (YES in S1401), the processing proceeds to S1402.

In S1402, the PDL interpretation unit 302 obtains the draw region of the target object from the path shape information 402 on the target object.

Next, the PDL interpretation unit 302 reads spooled objects and repeats processing in S1403 to S1405 until all of them are processed.

In S1403, the PDL interpretation unit 302 obtains the draw region of a spooled object from the path shape information 402 on the spooled object.

In S1404, the PDL interpretation unit 302 determines whether the draw region of the current target object overlaps with the draw region of the spooled object. If there is no overlap (NO in S1404), the next unread spooled object is read in a case where there is any unread spooled object, or the processing proceeds to S1406 in a case where there is no unread spooled object. If there is an overlap (YES in S1404), the processing proceeds to S1405.

In S1405, the PDL interpretation unit 302 sets the spooled object as a non-target for the discriminability reproducing color conversion processing and reads the next spooled object if there is any unread spooled object or proceeds to S1406 if there is no unread spooled object.

In S1406, the PDL interpretation unit 302 sets the current target object as a non-target for the discriminability reproducing color conversion processing and ends the present processing. Whether to set the target object as a target or a non-target for the discriminability reproducing color conversion processing can be set depending on whether to register the target object in the index list in the color conversion table 900.

As thus described, in the present embodiment, to perform the discriminability reproducing color conversion processing, an object for which processing involving color change is specified and an object overlapping with that object are set as non-targets for the discriminability reproducing color conversion processing. Then, the discriminability reproducing color conversion processing is performed on objects other than them. This prevents improper drawing and also enables discriminability reproducing color conversion.

Third Embodiment

In some cases, a page contains a plurality of objects for which processing involving color change is specified, and a combination of those plurality of objects overlaps with another object. In such a case, a combination of draw commands or objects for which processing involving color change is specified may cause the color of the other object overlapping with them not to change. In the third embodiment, in a case where a combination of draw commands or objects for which processing involving color change is specified is a combination that causes the color of the other object overlapping with them not to change, only the combination of the objects is set as non-targets of the discriminability reproducing color conversion processing. Then, for an object other than the combination of objects for which processing involving color change is specified, the discriminability reproducing color conversion processing is performed even if the object overlaps with the combination of the objects. This prevents improper drawing and also enables discriminability reproducing color conversion also for a page containing an object for which processing involving color change is specified. Note that the configuration of the printing control apparatus of the third embodiment is similar to that of the first embodiment shown in FIGS. 2 and 3. The following describes points different from the first embodiment.

Figure 15:
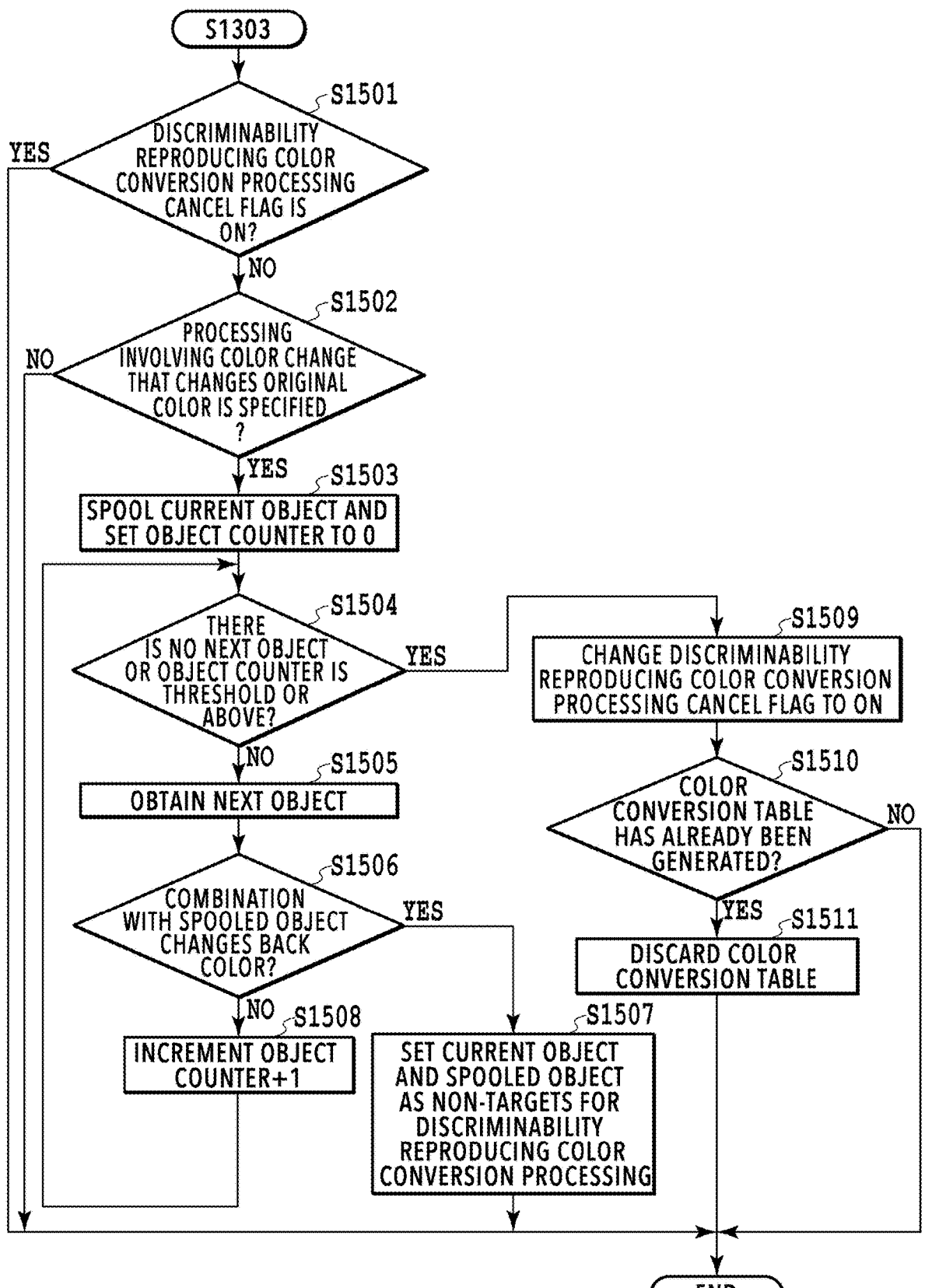
FIG. 15 is a flowchart showing ROP determination processing in a third embodiment.

FIG. 15 is a flowchart showing processing for determination as to specification of processing involving color change of an object, which is performed by the PDL interpretation unit 302 in the third embodiment. The series of steps of processing shown in the flowchart shown in FIG. 15 is implemented by the CPU 201 loading the programs stored in the ROM 203 into the RAM 202 and executing them.

In S1501, the PDL interpretation unit 302 determines whether the discriminability reproducing color conversion processing cancel flag is ON. If the discriminability reproducing color conversion processing cancel flag is ON (YES in S1501), the processing ends. If the discriminability reproducing color conversion processing cancel flag is OFF (NO in S1501), the processing proceeds to S1502. The discriminability reproducing color conversion processing cancel flag is set to OFF at the top of a page, i.e., is set to OFF in performing the present processing on an object within a page.

In S1502, the PDL interpretation unit 302 determines whether processing that changes the original color is specified in the operator information 404 on a target object for the present processing. The specification of processing involving color change that changes the original color is, for example, specification of ROP or α-blending, such as a logical OR operation (MERGEPEN), a logical AND operation (MASKPEN), and a logical XOR operation (XORPEN). If there is no specification of processing that changes the original color (NO in S1502), the present processing ends. If there is specification of processing that changes the original color (YES in S1502), the processing proceeds to S1503.

In S1503, the PDL interpretation unit 302 spools the current target object and sets an object counter to 0.

In S1504, the PDL interpretation unit 302 determines whether there is an object to be processed or whether the object counter is a threshold or above. The threshold used here can be set to any value according to the processing performance of the printing control apparatus. If there is no object to be processed or if the object counter is the threshold or above (YES in S1504), the processing proceeds to S1509. If there is an object to be processed and the object counter is below the threshold (NO in S1504), the processing proceeds to S1505.

In S1505, the PDL interpretation unit 302 obtains the next target object.

In S1506, the PDL interpretation unit 302 determines whether a combination of the next target object obtained in S1505 and the spooled object causes the color of another object overlapping with them not to change. If it is determined that the combination causes the color of the overlapping object not to change (to change back to the original color) (YES in S1506), the processing proceeds to S1507, and if it is determined that the combination causes the color of the overlapping object to change (not to change back to the original color) (NO in S1506), the processing proceeds to S1508. This determination is performed based on results of comparison between the spooled object and the next target object in terms of the specification of processing involving color change, the draw ranges of the objects, the colors of the objects, and the like.

Figure 16A:
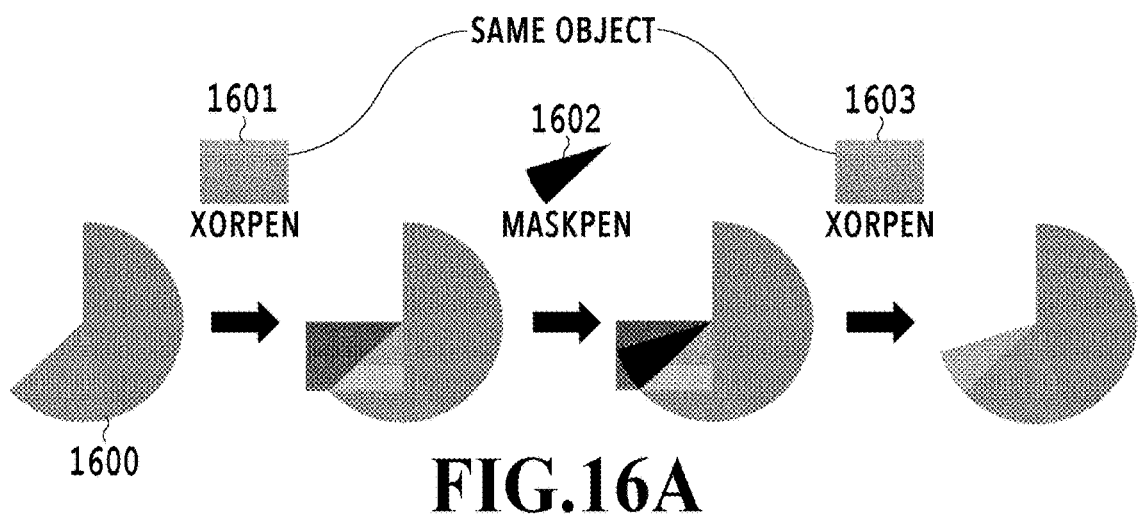
FIG. 16A is a diagram showing an example where the original color is not changed by a combination of ROP specifications that change the original color in the third embodiment.
Figure 16B:
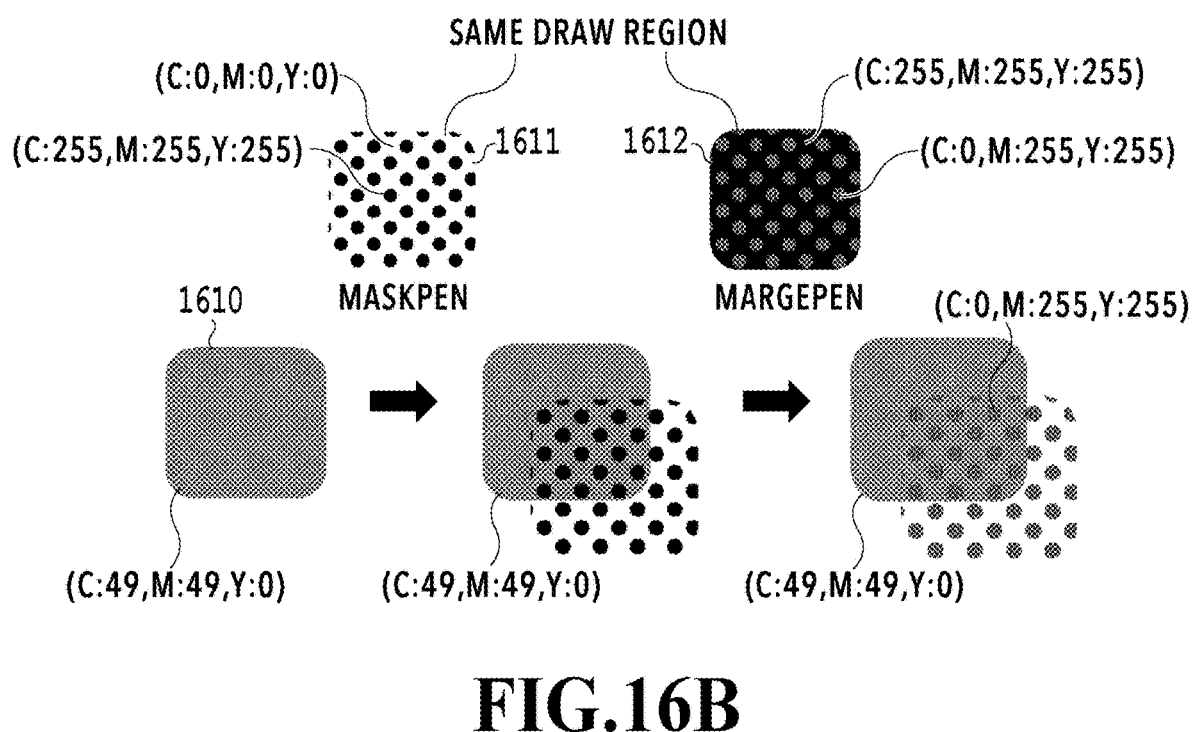
FIG. 16B is a diagram showing an example where the original color is not changed by a combination of ROP specifications that change the original color in the third embodiment.

FIGS. 16A and 16B show two specific examples of objects for which processing involving color change that causes the color not to change (to change back to the original color) is specified. FIG. 16A is an example of drawing a part of a pie chart by combining an XORPEN-specified object 1601, a MASKPEN-specified object 1602, and an XORPEN-specified object 1603 on a background image 1600. An XORPEN-specified or MASKPEN-specified object alone may possibly change the color of an overlapping object, but a combination of an XORPEN-specified object and a MASKPEN-specified object causes the color of an object overlapping therewith not to change in a case where all the following conditions are satisfied.

There is a property such that performing an XOR operation twice with the same color changes the color back to the original color, and the draw regions of the first and third XORPEN-specified objects 1601, 1603 coincide.

A mask image is specified for the second MASKPEN-specified object 1602.

FIG. 16A is an example where the above-described conditions are satisfied. After the first XORPEN-specified object 1601 is drawn and then the second MASKPEN-specified object 1602 is drawn, the color of the background image 1600 is changed. However, after the third XORPEN-specified object 1603 is drawn, the color of the object 1600 is therefore changed back to the original color and is unchanged from the original color.

FIG. 16B is an example of combining a MASKPEN-specified object 1611 and a MERGEPEN-specified object 1612 on a background image 1610 to draw a polka-dot pattern of an intermediary color. A MASKPEN-specified or MERGEPEN-specified object alone may possibly change the color of an overlapping object, but a combination of a MASKPEN-specified object and a MERGEPEN-specified object causes the color of an object overlapping therewith not to change in a case where all the following conditions are satisfied.

The draw regions of the MASKPEN-specified object 1611 and the MERGEPEN-specified object 1612 coincide.

The MASKPEN-specified object 1611 is formed only by black and white.

All the white pixels of the MASKPEN-specified object 1611 are black pixels in the MERGEPEN-specified object 1612.

In FIG. 16B, the MASKPEN-specified object 1611 and the MERGEPEN-specified object 1612 have the same draw region, and the MASKPEN-specified object 1611 is formed only by black (C, M, Y: 255) and white (C, M, Y: 0). Also, all the white pixels of the MASKPEN-specified object 1611 are black pixels in the MERGEPEN-specified object 1612. The conditions for not changing the original color are therefore satisfied. Thus, the color of the background image 1610 is unchanged from the original color.

Note that there are many other combinations of objects for which processing involving color change is specified that cause the original color not to change (to change back to the original color), and the present invention is not limited to the above combination. The description using FIG. 15 is resumed.

In S1507, the PDL interpretation unit 302 sets the spooled object and the target object obtained in S1505 as non-targets for the discriminability reproducing color conversion processing and ends the present processing.

In S1508, the PDL interpretation unit 302 increments the object counter by 1 and proceeds back to S1504.

If there is no object to be processed next or if the object counter is the threshold (YES in S1504), the PDL interpretation unit 302 sets the discriminability reproducing color conversion processing cancel flag to ON in S1509.

In S1510, the PDL interpretation unit 302 determines whether a color conversion table has been generated. If a color conversion table has already been generated (YES in S1510), the processing proceeds to S1511, and if a conversion table has not been generated (NO in S1510), the present processing ends.

In S1511, the PDL interpretation unit 302 discards the color conversion table.

As thus described, in the present embodiment, in performing the discriminability reproducing color conversion processing, in a case where the original color does not change due to a combination of objects for which processing involving color change is specified, only objects that actually change color are set as non-targets for the discriminability reproducing color conversion processing. Then, for the object that changes back to the original color due to the combination of objects for which processing involving color change, discriminability reproducing color conversion processing is performed. This prevents improper drawing and also enables discriminability reproducing color conversion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In printing a monochrome representation of color data, the present invention can achieve both efficient discriminability reproducing color conversion and prevention of improper drawing.

This application claims the benefit of Japanese Patent Application No. 2022-077194 filed May 9, 2022, which is hereby incorporated by reference wherein in its entirety.

What is claimed is:

1. An image processing apparatus that generates raster image data for printing based on PDL data included in a print job for printing a monochrome representation of color data, the image processing apparatus comprising:

analysis unit configured to analyze a draw command included in the PDL data and generates intermediate data; and color conversion unit configured to convert a color value of color specified for an object generated based on the draw command included in the intermediate data into a color value of a single color by using a color conversion method specified in the print job, wherein in a case where a first color conversion method that reproduces discriminability is specified in the print job as the color conversion method, if the PDL data includes a draw command that changes the color specified for the object, the color conversion unit changes the color conversion method to a second color conversion method that does not reproduce discriminability, at least for the object generated based on the draw command that changes the color.

2. The image processing apparatus according to claim 1, wherein in a case where the first color conversion method that reproduces discriminability is specified in the print job as the color conversion method, if the PDL data includes a draw command that changes the color specified for the object, the color conversion unit changes the color conversion method to the second color conversion method for all objects generated based on the draw command that changes the color and based on other draw commands included in a same page as the draw command that changes the color.

3. The image processing apparatus according to claim 1, wherein in a case where the first color conversion method that reproduces discriminability is specified in the print job as the color conversion method, if the PDL data includes a draw command that changes the color specified for the object, the color conversion unit changes the color conversion method to the second color conversion method for the object generated based on the draw command that changes the color and an object overlapping with the object generated based on the draw command that changes the color.

4. The image processing apparatus according to claim 3, wherein the intermediate data contains position-related information and layer-related information on the object which are based on a result of the analysis of the draw command by the analysis unit, and the color conversion unit identifies the draw command that changes the color specified for the object based on the layer-related information in the intermediate data and identifies the object overlapping with the object generated based on the draw command that changes the color based on the position-related information in the intermediate data.

5. The image processing apparatus according to claim 1, wherein
in a case where the first color conversion method that reproduces discriminability is specified in the print job as the color conversion method, if the PDL data includes a plurality of draw commands that change the color specified for the object and if a combination of the draw commands that change the color does not change the color specified for the object, the color conversion unit changes the color conversion method to the second color conversion method for an object generated based on the draw command that changes the color which is included in the combination.

6. The image processing apparatus according to claim 5, wherein
the intermediate data contains position-related information and layer-related information on the object which are based on a result of the analysis of the draw command by the analysis unit, and
based on the position-related information and the layer-related information, the color conversion unit identifies the combination of the draw commands that change the color that does not change the color specified for the object.

7. The image processing apparatus according to claim 1, wherein
the color conversion unit includes generation unit configured to generate a color conversion table in which a list in which an object to be color-converted using the first color conversion method is registered, a pre-conversion color value which is color specified for the object registered in the list, and a post-conversion color value for which an interval between color values of the single color is set depending on a number of the pre-conversion color values are stored in associated with one another, and
the color conversion unit rewrites the color value of the color specified for the object registered in the list into the post-conversion color value by using the color conversion table generated, and rewrites a color value of color specified for an object not registered in the list into a color value derived using the second color conversion method.

8. The image processing apparatus according to claim 1, further comprising image processing unit configured to generate raster image data of the single color based on the intermediate data generated by the analysis unit and a result of the color conversion by the color conversion unit.

9. The image processing apparatus according to claim 1, wherein
the analysis unit generates the intermediate data on a page by page basis.

10. The image processing apparatus according to claim 1, wherein
in the second color conversion method, the color value of the color specified for the object is converted into the color value of the single color in conformity to a uniform conversion rule.

11. An image processing method for generating raster image data for printing based on PDL data included in a print job for printing a monochrome representation of color data, the image processing method comprising:
analyzing a draw command included in the PDL data and generating intermediate data; and
converting a color value of color specified for an object generated based on the draw command included in the intermediate data into a color value of a single color by using a color conversion method specified in the print job, wherein
in the converting, in a case where a first color conversion method that reproduces discriminability is specified in the print job as the color conversion method, if the PDL data includes a draw command that changes the color specified for the object, the color conversion method is changed to a second color conversion method that does not reproduce discriminability, at least for the object generated based on the draw command that changes the color.

12. A non-transitory computer readable storage medium storing a program that causes a computer to execute an image processing method for generating raster image data for printing based on PDL data included in a print job for printing a monochrome representation of color data, the image processing method comprising:
analyzing a draw command included in the PDL data and generating intermediate data; and
converting a color value of color specified for an object generated based on the draw command included in the intermediate data into a color value of a single color by using a color conversion method specified in the print job, wherein
in the converting, in a case where a first color conversion method that reproduces discriminability is specified in the print job as the color conversion method, if the PDL data includes a draw command that changes the color specified for the object, the color conversion method is changed to a second color conversion method that does not reproduce discriminability, at least for the object generated based on the draw command that changes the color.

* * * * *